United States Patent

[11] 3,579,071

[72] Inventors Kurt Drescher;
Reinhard Springer, Dresden, Germany
[21] Appl. No. 887,708
[22] Filed Dec. 23, 1969
[45] Patented May 18, 1971
[73] Assignee Arbeitsstelle Fur Molekularelektronik
Dresden, Haus, Germany

[54] ELECTRONIC CIRCUIT ARRANGEMENT FOR PERFORMING WORK STEPS IN THE PRODUCTION OR TESTING OF SEMI-CONDUCTOR MEANS
24 Claims, 9 Drawing Figs.

[52] U.S. Cl...................................................... 318/603,
324/158
[51] Int. Cl....................................................G05b 19/28
[50] Field of Search........................................... 318/603,
569; 324/185

[56] References Cited
UNITED STATES PATENTS
3,427,518  2/1969  Cloup............................ 318/603
3,437,929  4/1969  Glenn........................... 324/158

Primary Examiner—Benjamin Dobeck
Attorney—Nolte and Nolte

ABSTRACT: The present invention relates to electronic circuit arrangements for performing predetermined work steps in the production or testing of semiconductor means arranged in rows and columns to form a matrix of said semiconductor means in a coordinate system with individual fields defined at intersections of said rows and columns, wherein row and column measuring and counting means generate coordinate signals which are compared with preselected coordinate digits to produce preselection signals which are channeled through logic circuits to drive means of a positioning apparatus which positions a workpiece support or a tool, for example, in a photorepeater or in a wafer prober, in accordance with the identification of the preselection signals by said logic circuits, whereby any desired extraneous structures may be arranged or tested in said matrix of semiconductor means.

KURT DRESCHER
REINHARD SPRINGER
INVENTORS

BY Nolte & Nolte
ATTORNEYS

Patented May 18, 1971

KURT DRESCHER
REINHARD SPRINGER
INVENTORS

BY Nolte & Nolte.
ATTORNEYS

Fig. 6.

KURT DRESCHER
REINHARD SPRINGER
INVENTORS

BY
Nolte & Nolte
ATTORNEYS

Fig. 8.

KURT DRESCHER
REINHARD SPRINGER
INVENTORS

Fig. 9.

ELECTRONIC CIRCUIT ARRANGEMENT FOR PERFORMING WORK STEPS IN THE PRODUCTION OR TESTING OF SEMI-CONDUCTOR MEANS

BACKGROUND OF THE INVENTION

The present invention relates to electronic circuit arrangements for performing predetermined work steps in the production or testing of semiconductor means. More specifically, the invention relates to the automatic insertion of any desired extraneous structures into a matrix scheme of semiconductor means whereby the extraneous structures may be arranged in individual fields positioned at any desired position in the matrix or the structures may be arranged in rows and/or columns of the matrix. Such extraneous structures are required, for example, as positioning marks for coordinating the photomasks of a set of masks for or to a semiconductor wafer. The extraneous structures are also necessary as test patterns for the control of the individual technological process which are employed in the entire manufacturing procedure of semiconductor elements or solid-state circuit arrangements, for example, according to the so-called "Planar" techniques. The extraneous structures are also useful for the systematic arrangement of differing structures on a semiconductor wafer, that is, different solid-state circuits as are employed for group integration.

Semiconductor wafers which pass through the production in which such photomasks are employed, are automatically tested by means of wafer probers subsequent to the performance of collective process steps on the entire wafer. In order to achieve useful or meaningful measuring results in such testing, it is necessary that the testing process takes into account the different geometric and electrical characteristics of the extraneous structures arranged in the wafer. In addition, it is necessary to conduct the testing steps in such a manner that the structures which have a deviating arrangement of contact fields are not destroyed by the testing steps.

Prior to the present invention, adapting devices have been known for semiautomatic apparatus for the production of photomasks in connection with photorepeaters or step-and-repeat cameras which permit the arrangement of test patterns. These adapting devices work automatically with regard to each row of a matrix. However, any extraneous structures are taken into account by the operator if such structures are absolutely necessary whereby the operator controls the operation by manually interfering with the automatic operation, thus making prior art devices semiautomatic. This method is employed exclusively in connection with testing by means of multiprobe testers such as wafer probers. Wafer probers which automatically take into account extraneous structures in accordance with a special program are not known in the art.

Furthermore, prior art devices do not permit the automatic arrangement of extraneous structures in a matrix scheme. To the contrary, prior art devices make it necessary to manually interfere repeatedly with the production steps during the entire production or testing procedures. Thus, it goes without saying that such manual control calls for high qualifications in the operating personnel. Even where highly qualified personnel is available, it is not possible to avoid production or manufacturing defects which are subject to individual influences, for example, the varying degrees of alertness in the operating personnel may influence production defects. Accordingly, the qualification of the operating personnel and the resulting efficiency influence substantially economic production and testing of solid-state circuit arrangements, especially where extraneous structures are present in large numbers and where such structures play an important part in the production and testing. Moreover, the complicated distribution of extraneous structures within the matrix scheme by means of semiautomatic devices is necessarily subject to all human shortcomings and thus disadvantages result.

OBJECTS OF THE INVENTION

In view of the above, it is the main object of the invention to overcome the outlined drawbacks by providing fully automatic means for the insertion of extraneous structures into a matrix scheme of semiconductor means.

More specifically, it is an object of the invention to improve the technical and economic results in the production or the testing of semiconductor elements which are subject to subjective influences of the operating personnel by reducing or eliminating such influences.

Yet another object of the invention is to assure a high efficiency simultaneously with the production of high-quality photomasks.

Yet another object of the invention is to make possible the complicated distribution of extraneous structures in a matrix scheme of semiconductor elements or semiconductor circuits.

Yet another object of the invention is to provide a circuit arrangement for the realization of predetermined typical process steps in the production and/or testing of semiconductor elements especially for automatically inserting or arranging any desired extraneous structures into a matrix scheme in which the positional coordinate of the extraneous structures are programmed prior to the production or testing steps by means of suitable preselectors.

It is also an object of the invention to provide a circuit arrangement of the above type which will control a workpiece or tool-positioning apparatus, for example, for the production of photomasks in comblike motion cycles as they are used exclusively in connection with such photomask productions. Such comblike motion cycles are also employed to some extent in so-called wafer probers.

Yet another object of the invention is to provide the circuit arrangement of the above type for controlling a wafer prober in a meander motion cycle which is employed predominately in connection with wafer probers.

SUMMARY OF THE INVENTION

According to the invention, there is provided in a tool-positioning apparatus column-spacing measuring means as well as an electronic column counter and row-spacing measuring means as well as an electronic row counter. The digits which are represented by the column counter and the row counter correspond to the column and row coordinates of the respective matrix point in a matrix scheme arranged or to be arranged on a workpiece, which coordinate point is located during the motion cycles of the positioning apparatus exactly within the work area of a tool. To each matrix point there is assigned the topological design of a semiconductor element or of a solid-state circuit. The term "workpiece" may cover for example, a photoplate or a semiconductor wafer or disc whereas the term "tool" may, for example, cover an optical projection system in a photorepeater or the tool may comprise a set of testing probes in a so-called wafer prober.

The column counter as well as the row counter are operatively connected to a given number of preselectors which in turn are operatively connected to logic circuit channels for identifying the preselection signals resulting from a comparison of the digits to which said preselectors were adjusted with signals provided by set column and row counters. The logic circuit channels may comprise digital circuits as well as switching means and are connected to control drive means of the positioning device in order to control the operational or process steps of any particular apparatus such as a photorepeater or a wafer prober. The logic circuit channels are arranged in such a manner that typical process steps are either prevented or their performance is assured at certain matrix points which are predetermined by the adjustment of said preselectors to corresponding digits. Such typical process steps may comprise, for example, the exposure in the production of photomasks or the stopping of the table movement, the lowering of the testing probe and the testing step itself in connection with the automatic testing of solid-state circuits on a wafer.

The selection of any desired individual field in a matrix scheme is accomplished in that the output signals of a preselector circuit for a column counter, and the output signals of a preselector unit for a row counter are logically combined in pairs by means of an AND gate. Each pair of preselector units fixes or defines the position of an individual field within the matrix. The outputs of all AND gates are interconnected by means of an OR gate. An interference with the normal process steps take place only at such matrix points the coordinates of which correspond to digits to which pairs of preselector units have been adjusted, for example, by turning a dial to the desired digit. For the selection of entire rows, a preselector unit for each row is connected to the row counter. A certain number of preselector units are connected in parallel and interconnected through an OR gate, whereby the number of preselector units so interconnected by the OR gate are determined by the particular purpose which the circuit will be used. The selection of entire columns is accomplished in the same manner as that of selecting entire rows except that one preselector unit for each column is connected to the column counter rather than to the row counter.

The changeover from preventing of typical process steps at preselected matrix points during a complete motion cycle of the positioning apparatus, to carrying out rather than preventing such process steps only at the preselected matrix points during the further motion cycles of the positioning apparatus, is accomplished by means of a switch which disconnects an inverter connected to the OR gates provided for the individual field selection as well as for the column selection and for the row selection. By disconnecting the inverter, the logical level of the signal is reversed and thus the effect on the control drive means for the tool for carrying out the typical process steps is also reversed. Further switching means may be provided for selective connecting the output of said OR gates with the drive means whereby the selection of individual fields or rows and/or columns is determined. The preselector units for the individual fields may then also be employed for the preselection of rows or columns provided that either only individual fields or only rows and/or columns are to be preselected. By employing separate preselector units for the individual fields and for the columns as well as for the rows and an additional logic OR gate interconnection, it is possible to use these three preselection units simultaneously and independently of each other. Thus, the possibility exists of eliminating, during the first motion cycle in accordance with the adjustment of the respective preselector units, any desired individual fields, rows and columns and to include into the subsequent motion cycles only certain ones of the previously eliminated matrix points by suitably changing the adjustments of the preselector units and the position of the switching means.

The partial interference with the sequence of process steps of the apparatus upon reaching a matrix point which has been selected by means of the preselector units, is accomplished by combining the output signals of the preselector units with the signals signifying desired work steps, by means of an AND gate. The latter signals will be referred to as work step trigger signals. The triggering of the typical process steps is accomplished, in principle, by the output signals of the preselector units of the column and row-spacing measuring means which determine the matrix dimension in the row direction ($x$-direction) or in the column direction ($y$-direction). Stated differently, the work steps are triggered by the signals which are fed to the input of the column counter or respectively to the input of the row counter where these signals are counted as matrix points. In order to assure a satisfactory function, the output signal of the column-spacing measuring means is delayed or held by means of a monostable multivibrator until the signal which passes through the column counter, the preselector units and the logic-identifying circuits appear statically at the second input of said AND gate. The delay or holding of the output signal of the column-spacing measuring means is necessary since the signal which passes through the identifying channels is also delayed thereby. The output signal of said AND gate is fed to the drive means of the tool and of the positioning apparatus to carry out the typical process steps. This arrangement is suitable for performing comb-shaped motion cycles as well as meander-shaped motion cycles. However, basically, it would be preferable to employ this arrangement for controlling the typical process steps of a wafer prober or multiprobe testing apparatus.

In the production of photomasks, the work step trigger signal must be fed without delay to the drive means of the optical projection system in order to trigger the exposing means. Otherwise, nonuniform motions of the positioning apparatus would cause unpermissible positional errors of the structures in the matrix scheme. However, if the trigger signal is fed to the AND gate without delay by bypassing the monostable multivibrator, then the signal which upon reaching preselected matrix points is being delayed in the preselection or identifying channels is not yet present at the other input of the AND gate and, accordingly, the process step is triggered, although it was supposed to have been prevented. This problem has been solved according to the invention in that the preselection units corresponding to a matrix point having coordinates $x_n$, $y_n$ to be preselected, are adjusted to the coordinates $(x_n-1)$ and $(y_n)$. The condition for a proper operation in this instance is that the width of the work step triggering signal is smaller than the delay time in the preselector or identifying channel. An absolutely safe operation is achieved if the output signals of the OR gates of the individual fields or of the column preselector units are fed to a monostable multivibrator which produces reset pulses for triggering a bistable multivibrator out of its set position or condition into its working condition. The set condition of the bistable multivibrator is the synchronized condition. Incidentally, the preselection of rows is not involved in this instance.

The output of the just-mentioned bistable multivibrator is interconnected with the AND gate and for combining the trigger signal and the identified preselection signals. The bistable multivibrator feeds the necessary static preselection signal to the AND gate prior to the arrival of the work step trigger signal. In this connection, the preselector units which are coupled to the column counter are adjusted to a digit or coordinate $x_n-1$. A further monostable multivibrator which has a delay time smaller than that of the first monostable multivibrator is employed for resetting the bistable multivibrator into its synchronized or set position in response to each trigger signal. This circuit arrangement is preferably employed for comb-shaped motion cycles if difficulties are to be avoided.

Where it is necessary to incorporate a large number of extraneous structures into a matrix system in the form of individual fields, rows and/or columns, it is possible to use electromechanical or electronic storage elements instead of mechanical switches for the preselection units. These electromechanical or electronic storage elements are adjusted by means of intermediate storage devices, for example, perforated tapes or magnetic core storage devices, during the motion of the positioning apparatus whereby the adjustment is for the next following matrix point or line.

If during the first motion cycle rows as well as columns are to be omitted, then during the following motion cycles, only the structures of rows or that of columns may be arranged at the crossing points of rows and columns. This is accomplished by combining the preselection signals of the row and column preselection units in an AND gate, then inverting the combined signal and feeding it to a further AND gate which receives simultaneously any desired combination of preselection signals of the rows, columns and individual field preselection units. The use of any such preselection signal is possible since these signals are fed through an OR gate. The output of the second AND gate is connected either through an inverter or directly with the AND gate for combining the work step trigger signals with the preselection signals. If the inverted preselection signal of the individual field preselection unit is fed to the second AND gate, then an additional selection of individual fields is accomplished by a suitable adjustment of the respective preselection units whereby such individual fields are located on the respective preselected rows or columns.

In order to omit right from the start such rows in which, due to the preselection adjustment, no process step is to be performed during the respective motion cycle and in order to thus reduce the time required for each motion cycle, the preselection signals of the row preselection units for individual fields, and thus for rows, are interconnected through OR gates and are fed to the control drive means through suitable logic and basic digital circuits. Furthermore, the motion cycle is terminated by a signal from the preselection unit which is adjusted to the maximum row preselection digit or coordinate.

It is an advantage of the invention that it accomplishes a completely automatic insertion of extraneous structures in the form of individual fields, rows or columns in any desired position in a matrix scheme whereby manual interference during the entire production or testing process is avoided. This has the further advantage that on the one hand the personnel requirement is reduced to a minimum and that on the other hand the desired process sequence is assured.

Further advantages are seen in that the automatic sequence results in an increased precision as well as in an increased efficiency. The time necessary for the production of photomasks has been reduced and, accordingly, the production has been made more economical. The invention also increases the reliability of measured results in the testing process of semiconductor wafers by means of wafer probers. A further advantage is seen in that the operating costs have been reduced because the operating personnel is required to usually exchange the workpieces and to perform the programming.

In order that the invention may be clearly understood, it will now be described, by way of example, with reference to the accompanying drawings, wherein the basic logic and digital circuits have been arranged so that for all embodiments of the invention a closed circuit signal flow is obtained.

Before describing the embodiments of the invention in detail, it should be noted that the following description refers to a comb-shaped motion cycle of a workpiece-positioning apparatus. However, the function of the circuit arrangement remains substantially the same during a meander-shaped motion cycle.

Figure 1:
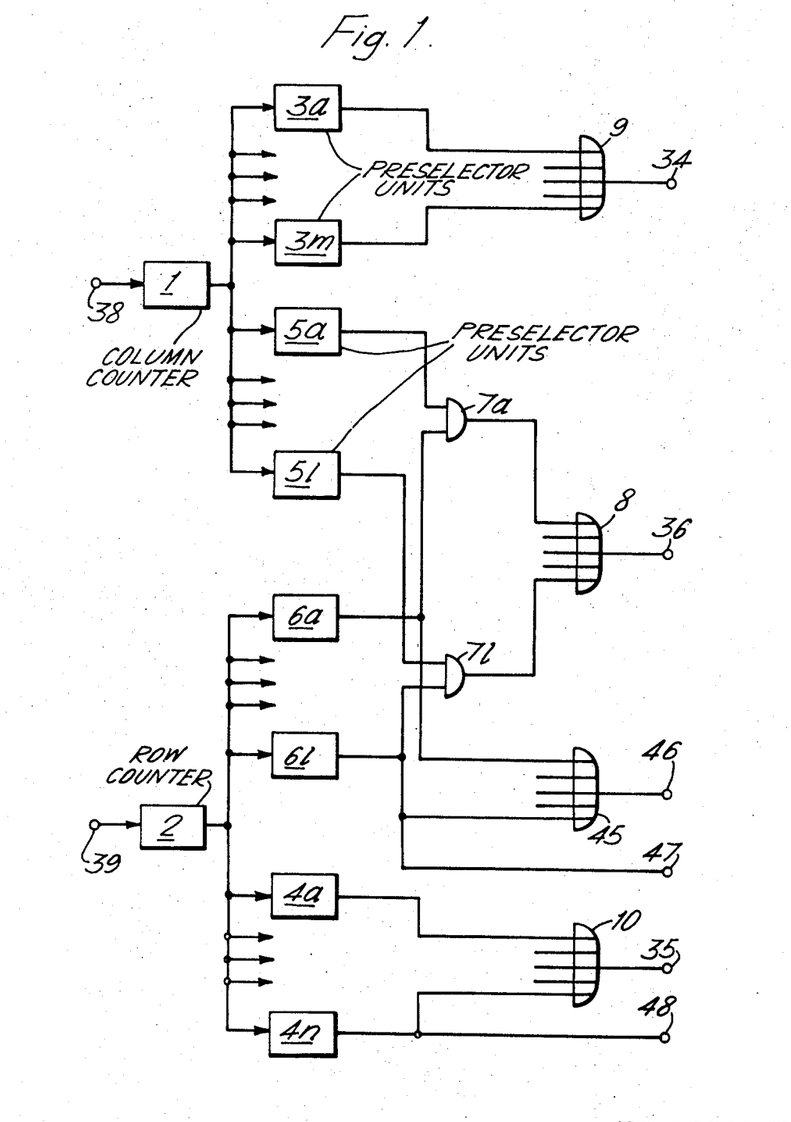
FIG. 1 illustrates a circuit arrangement for producing or identifying separate preselection signals for any desired individual fields, rows and columns.
Figure 8:
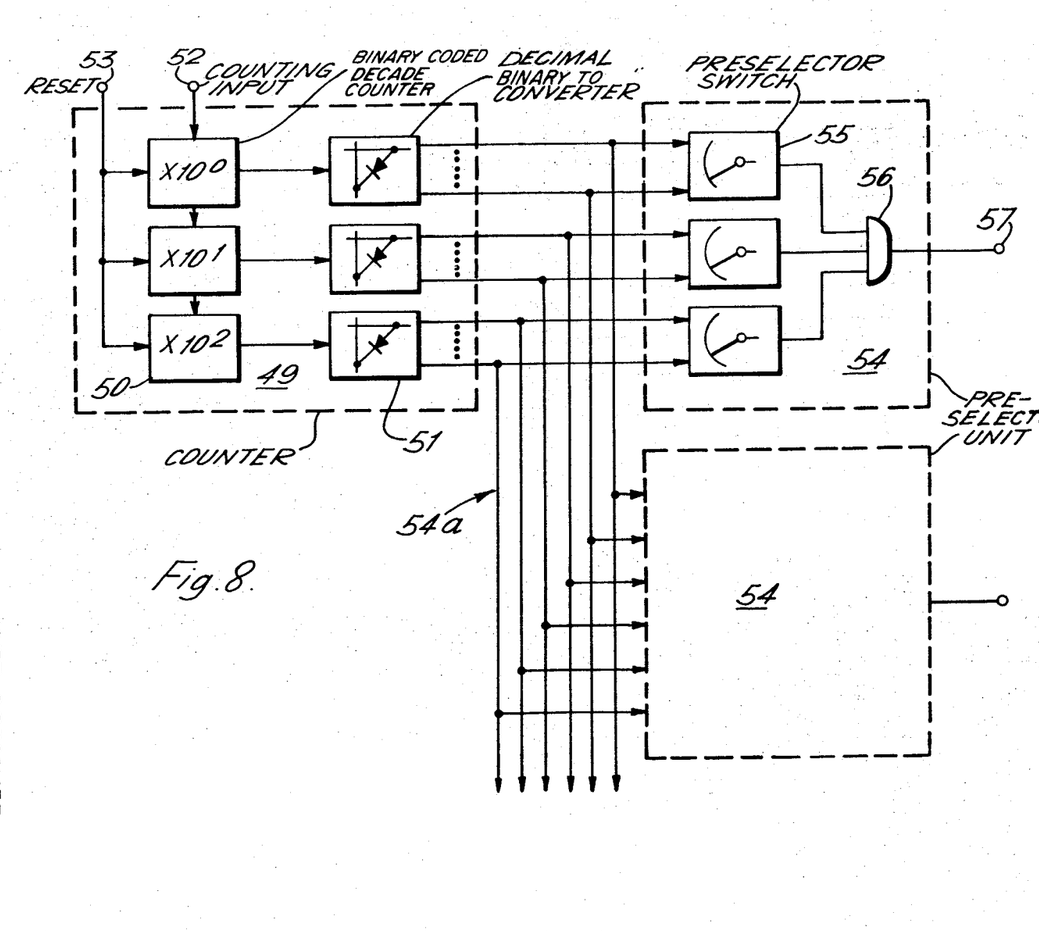
FIG. 8 illustrates an embodiment of a preselection unit as it is employed in the circuits of the present invention.
Figure 9:
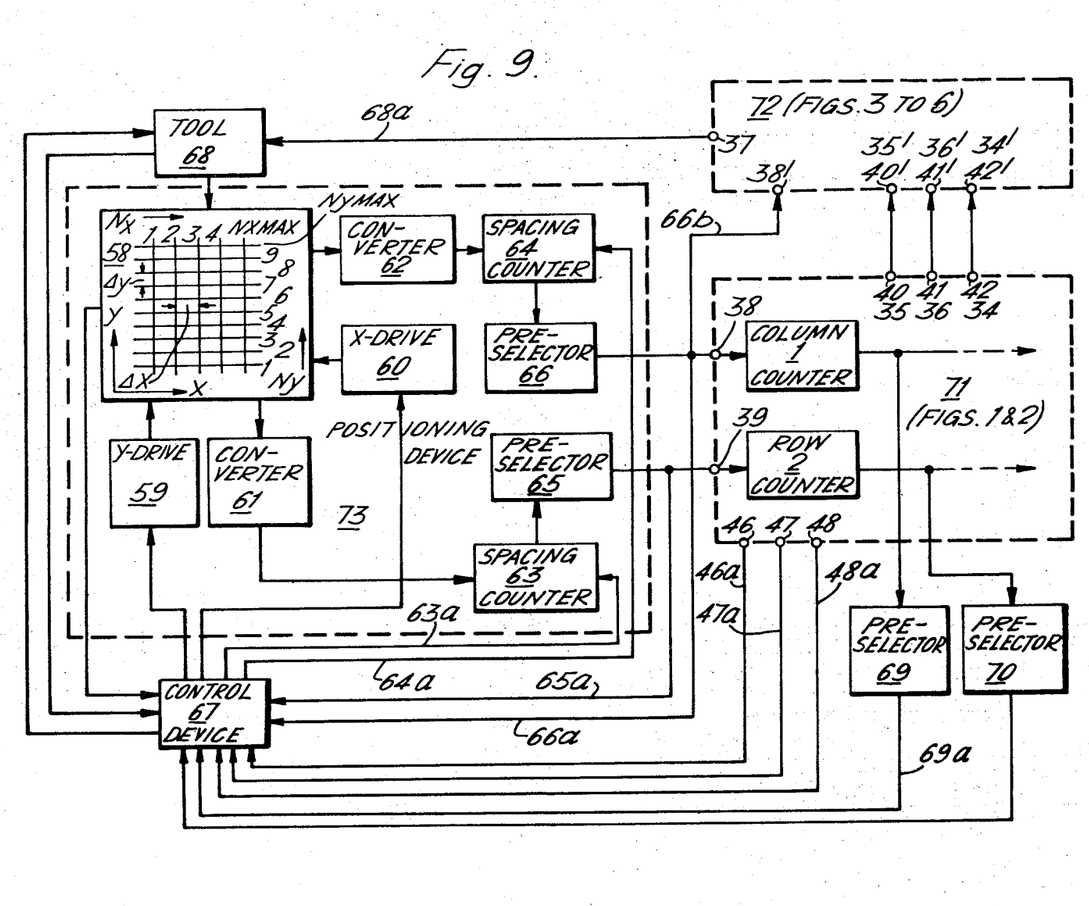
FIG. 9 shows an overall block diagram of the circuit arrangement according to the present invention.

In order to explain the overall function of the circuit arrangement according to the invention, reference is made to FIG. 9 which comprises a positioning apparatus for the workpiece. The positioning apparatus may be, for example, a cross table 58 which is movable in the x-direction as well as in the y-direction by suitable control drive means to be described below. A photoplate, not shown, is attached to the cross table 58. Initially, the cross table 58 is in its starting position wherein the x-coordinate and the y-coordinate are zero. In such initial position, the preselection units 65, 66, 69, 70 and 3 to 6 are adjusted to the preselection digits or coordinate values, in accordance with the desired program. The preselection units 3 to 6 are shown in FIG. 1 and details of the preselection units will be described with reference to FIG. 8.

In the initial position of the cross table 58, the electronic counters 1 and 2 (FIG. 1) as well as 63 and 64 (FIG. 9) are set to their zero position. Initially, the drive means 59 for the cross table 58 are switched on through a control device 67 whereby the cross table 58 is moved in the y-direction of the coordinate system. The drive means 59 will generally comprise a combination of an electric motor and a reduction gear as well as magnetic clutches or it may comprise a motor generator combination with a reduction gear. These drive means are well known in the art.

When the cross table 58 moves in the y-direction, a converter 61 produces an electrical output signal in response to the measured distance which the cross table 58 travelled during its motion whereby one signal pulse is generated in response to passing of the cross table 58 through each length increment.

The length increments are fixed by an incremental measuring system according to which the spacing between adjacent columns as well as the spacing between adjacent rows is divided into such length increments. The electrical pulses corresponding to these lengths increments are counted by a respective row-spacing counter 63 and by a column-spacing counter 64. The spacing counters 63 and 64 are connected to the cross table 58 through signal converters 61 and 62, respectively. The output of the row-spacing counter 63 is connected through a preselector 65 to an input 39 of a row counter 2 shown in FIGS. 1 and 2, as well as in FIG. 9. The output of the column-spacing counter 64 is similarly connected through a preselector 66 to an input 38 of the column counter 1.

As soon as the preselected digit to which the preselector 65 has been adjusted is reached by the advance of the spacing counter, a control signal is generated and fed to inputs of the control device 67. These control signals stop the motion of the cross table 58 in the y-direction and starts the motion in the x-direction. Simultaneously, the row-spacing counter 63 is reset to its zero position by a signal fed by the control device 67 to the counter 63 through a connection lead 63a and the row counter 2 indicates in response to the output signal of the preselector 65 the count of the first row. Connecting means 65a, 66a and 66b provide for the distribution of the work step trigger signals.

During the motion of the cross table 58 in the x-direction, the length increments are transformed into electrical pulses by the converter 62. The output of the converter 62 is connected to the column-spacing counter 64 which counts the pulses as an indication of the distance travelled by the cross table 58. As soon as the digit which has been preselected in the preselector unit 66 has been reached by the count of the counter 64, a signal is generated and fed through the circuits of FIGS. 3 to 6 which are symbolized in the box 72 in FIG. 9, to the tool 68 through a connector 68a which connects the output 37 of circuit 72 with a control input of the tool 68. For instance, if the tool is a projector system, the input pulse will trigger the emission of a light pulse to cause an exposure on the photoplate. The column-spacing counter 64 will be returned to its zero position by a signal received by the control device 67 through a connector 64a. At the same time, the column counter 1 will register the fact that the first column has been reached.

The above-described motion of the cross table 58 is now continued and upon reaching each of the next adjacent columns, a light pulse is triggered in the projector 68. The column counter 1 in effect counts such light pulses.

As soon as the column counter 1 reaches a count which corresponds to the preselection digit to which the preselector 69 has been adjusted, the motion of the cross table 58 in the x- direction is stopped and reversed. Stated differently, the motion of the cross table 58 in the x-direction is reversed when the predetermined number of structures corresponding to $N_{xmax}$ has been projected into a row of the photoplate. The reversal of the direction of motion is accomplished by feeding a control signal from the output of the preselector 69 through the connector 69a to the control device 67 which in turn controls the x-drive 60. Simultaneously, the column counter 1 is reset to its zero position. If now the cross table 58 has moved backwardly in the same row until the coordinate x=0 has been reached, a new motion cycle in the y-direction is started.

The motion in the y-direction is stopped upon reaching the row spacing, that is, the next adjacent row. Upon reaching the next adjacent row, the continuous motion in the x-direction is resumed for that row while simultaneously light pulses are periodically triggered. This sequence of motions in the y-direction and in the x-direction is repeated until the row counter 2 reaches a counting position which corresponds to the preadjustment of the preselector 70, namely the preselection digit $N_{ymax}$. Stated differently, the sequence of motions is repeated until the preselected number of rows has been reached. When the last row has been completed, the cross table 58 is returned to its starting position having the coordinates x=0 and y=0.

During the entire first motion cycle, the triggering of light pulses is prevented at all matrix points $x_n$, $y_n$ which are marked by the column preselector units 3, the row preselector units 4 and the preselector units 5 and 6 for individual fields. During one or more of the following motion cycles, however, the light pulses are triggered only in those matrix points which are preselected by the preselector units 3, 4, 5 and 6. The control signals are fed to the control device 67 through lines 46a, 47a, 48a connecting the respective outputs 46, 47, 48 of the logic circuits shown in FIGS. 1 and 2 which are symbolized in block 71 of FIG. 9, to the input of the control device 67. These control signals assure that the cross table 58 scans only through those rows which are marked by means of the preselector units 4 and 6 and that the motion cycle is stopped upon completion of the row which was preselected by means of the preselection units $4_n$ or $6_1$ respectively.

The above-described operation of the electronic circuit arrangement shown in FIG. 9 applies basically also to the operation of a wafer prober. The only difference resides in that the motion in the x-direction is stopped at each matrix point and only after completion of the testing step is the motion continued, and in that instead of the projector system 68, a set of probes is employed which is lowered at each matrix point and which is lifted again upon the completion of the testing step at any particular matrix point.

Figure 2:
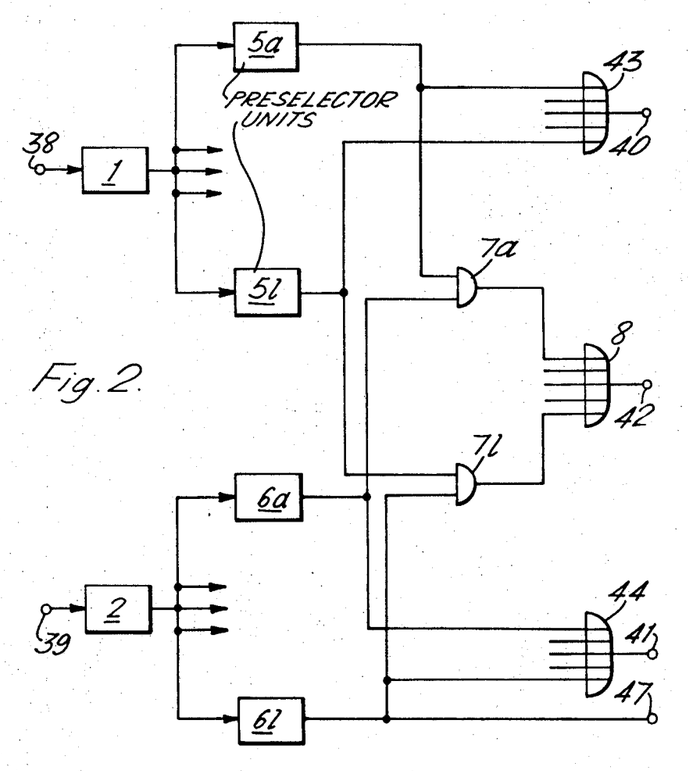
FIG. 2 is a circuit arrangement for producing preselection signals for any desired individual fields or rows or columns.

The preselector units shown in blocks 3a to 3m, 4a to 4n, 5a to 5l and 6a to 6l in FIG. 1, as well as in blocks 5a to 5l and 6a to 6l in FIG. 2, and in blocks 65, 66, 69 and 70 in FIG. 9 are illustrated in more detail in block 54 shown in FIG. 8. Each preselection unit block 54 comprises N cooperating preselector switches 55. Each of the preselector switches 55 comprises a 10 positional switching means and an output connected to an AND gate 56. The output 57 of the AND gate 56 constitutes the output of the preselector block 54. Each preselector positional switch 55 is connected with its input through a conductor network 54a to the outputs of an electronic counter 49 which comprises a counting input 52 and a reset input 53 as well as a number of decades 50 corresponding to the number of selector switches 55 so that each selector switch 55 is connected to its respective own decade 50 of the counter 49. Between each output of the decades 50 and the respective input of a preselector switch 55 there is arranged a binary to decimal decoding network 51. The preselector switches 55 may be provided in the form of simple manually operated multiposition or stepping switches. On the other hand, it is also possible to use special coding switches in the form of presettable electronic switching means. Any of these preselector switching means is well known in the art.

The preselection number may, for example, have N digits corresponding to the number of preselector switches. Thus, the desired number may be preselected by adjusting each preselector switch to one digit of the desired preselection number. It should be noted that all the mentioned preselection units are arranged in the same manner and serve similar functions. However, any individual preselection unit may differ from other such units in the number of available decades.

At the output terminal 57 of the AND gate 56 appears a logic 1 signal if the count of the counter 49 corresponds to the preselected number or digit of the preselector 54. The programming is accomplished by switching or adjusting the preselector units to the desired preselection numbers whereby the row spacing $\Delta y$ and the column spacing $\Delta x$ as well as the total number of rows $N_{ymax}$ and the total number of columns $N_{xmax}$ are determined along with the row and/or column coordinate in which typical process steps are to be prevented or are to be carried out.

FIG. 1 illustrates an electronic circuit arrangement for generating the desired preselection signals. The input terminal 38 of the column counter 1 which is also shown in FIG. 9 receives the output signal of the column preselector 66 as soon as a column is reached during the motion of the cross table 58 of the positioning apparatus 73 in the row or x-direction. The output of the column counter 1 is connected to the input of preselection units 3a to 3m which in turn are connected with their respective outputs to an OR gate 9. The OR gate 9 has an output 34 at which appears a logic 1 signal as soon as any of the digits which are preselected in the preselection units 3a to 3m corresponds to the digit indicated by the column counter 1. Stated differently, the output 34 produces a signal of the logic 1 type when the comparison between a preselection digit or number to which the preselector units 3 have been adjusted corresponds to the count of the counter 1. The above-described operation also applies to the row counter 2 which receives a signal at its input 39 as soon as a row is reached during the motion in the column or y-direction. The row counter 2 is connected with its output to preselector units 4a to 4n which in turn are connected with a further OR gate 10 having an output 35. Upon reaching of such row which corresponds to the digits to which the preselector units 4a to 4n have been adjusted, a logic 1 signal is produced at the output 35 of the OR gate 10.

In the above manner, the preselector units 3a to 3m and 4a to 4n are used to identify the preselection signals as column signals or as row signals respectively.

According to the invention, it is further possible to identify preselection signals as individual field signals. The individual field signals are produced by combining in pairs one of the preselector units 5a to 5l connected to the column counter 1, with one of the preselector units 6a to 6l connected to the row counter 2. This combination of the individual field-identifying signals is accomplished through AND gates 7a to 7l connected to the outputs of the preselector units 5a to 5l and 6a to 6l. The output signals of the AND gates 7a to 7l are fed to respective inputs of a further OR gate 8 having an output 36. Signals are produced at the output 36 provided that the count of the column counter and of the row counter correspond to preselected digits or numbers to which pairs of preselector units 5a to 5l and 6a to 6l have been adjusted.

FIG. 1 further shows output terminals 47 and 48 which produce signals for discontinuing the motion of the cross table in the positioning apparatus. This will be described in more detail below.

FIG. 2 is a modification of the circuit arrangement of FIG. 1. The difference between the two embodiments resides in that in FIG. 2 the preselection units 5a to 5l and the preselection unit 6a to 6l are employed for the preselection of individual fields as well as of columns and rows respectively. In this instance, fewer preselection units are required. However, it is only possible to preselect rows and columns independently of each other, and it is not possible to preselect individual fields and columns or individual fields and rows whereas in the embodiment of FIG. 1 all three preselection variants may be adjusted and arranged independently of each other.

Figure 5:
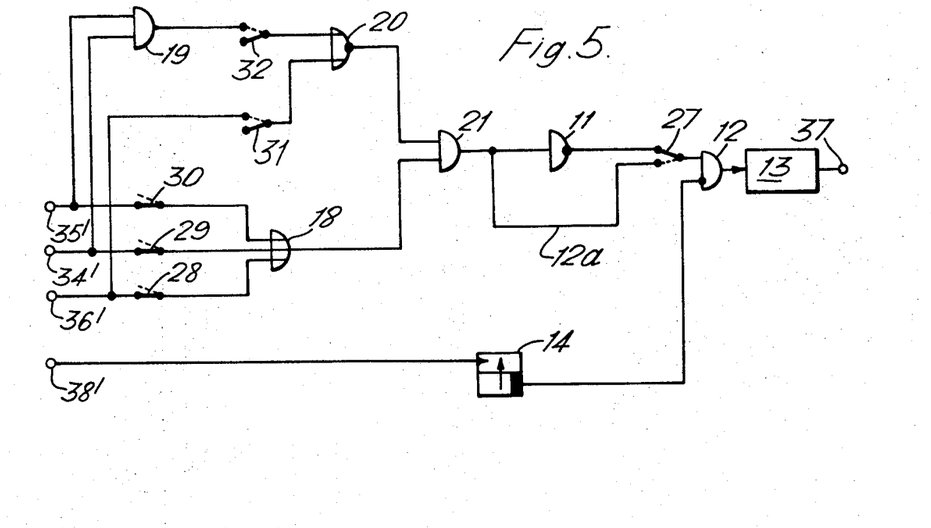
FIG. 5 illustrates a circuit arrangement for combining the preselection signals of individual fields and of rows and of columns with work steps trigger signals for a wafer prober.
Figure 6:
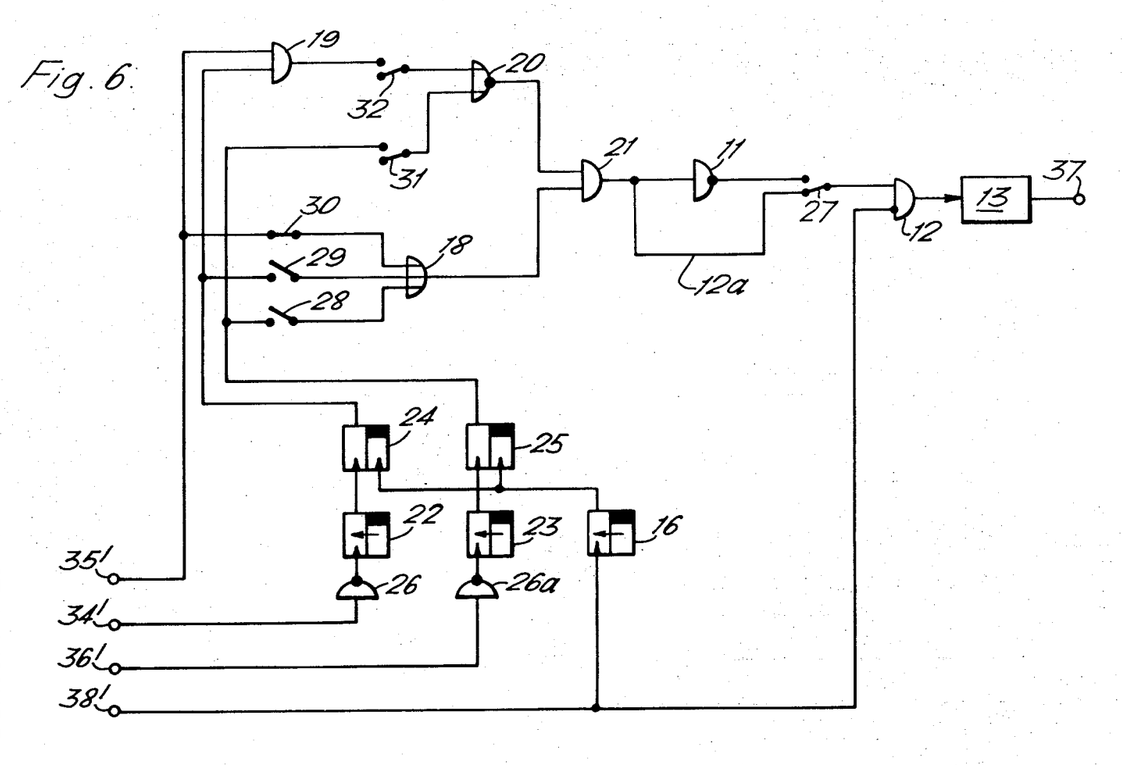
FIG. 6 is a circuit arrangement for combining the preselection signals of individual fields and rows and columns with the work step trigger signals for devices used in the production of photomasks.

The output signals of the preselection units 5a to 5l for the preselection of columns are fed to respective inputs of an OR gate 43 having an output 40 which produces an output signal in the same manner as explained above. The output signals of the preselection units 6a to 6l for the preselection of rows are fed to respective inputs of an OR gate 44 having an output 41 which produces an output signal also in the manner described above. The OR gate 8 and the AND gate 7a to 7l in FIG. 2 have the same function as in FIG. 1. However, OR gate 8 in FIG. 2 has an output 42 which must be distinguished from the output 36 of FIG. 1 due to the distinction which must be made between FIGS. 3 and 4 on the one hand, and FIGS. 5 and 6 on the other hand. The input of FIGS. 3 and 4 are connected to the output of the signal-identifying circuit shown in FIG. 2, whereas the input of FIGS. 5 and 6 are connected to the outputs of the signal identifying circuit shown in FIG. 1.

Figures 3, 4:
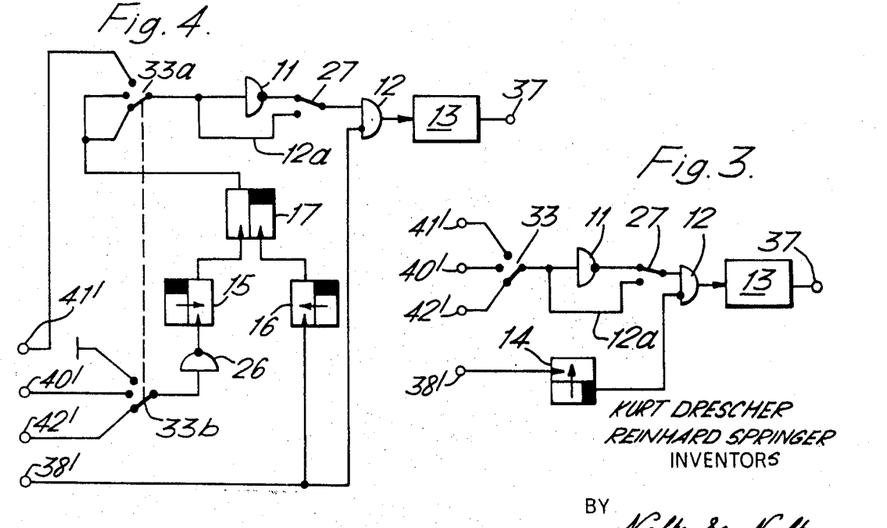
FIG. 3 illustrates a circuit arrangement for combining the preselection signals of individual fields or rows or columns with the work step trigger signals for a wafer prober.
FIG. 4 illustrates a circuit arrangement for combining the preselection signals of individual fields or of rows or of columns with the work step trigger signals for an apparatus for producing photomasks.

Referring now to FIG. 3, there is shown a circuit arrangement for combining the individual preselection signals with the signals for triggering the typical process or testing steps. In order to supply the preselection signals which have been identified in FIG. 2 as column signals or as row signals or as individual field signals, the output terminals 40, 41 and 42 of FIG. 2 are connected to respective input terminals 40' to 41' and 42' as shown in FIG. 3. A multiposition switch 33 is connected to the input terminals 40', 41' and 42' and thus to the OR gate 43, 44 or 8. The output terminal of the multiposition switch 33 is connected to one input of an AND gate 12, either directly through a bypass 12a and a further selection switch 27, or through a signal inverter 11 and through said further switch 27 which is a two position selection switch for bypassing the signal inverter 11. In the position of switch 27 as shown in FIG. 3, the inverter 11 is not bypassed so that the signal will be inverted in its polarity before it reaches the input of the AND gate 12.

Furthermore, the AND gate 12 is connected with its other input to a monostable multivibrator 14, the input of which is connected to the input 38 of the column counter 1 shown in FIGS. 1 and 2. The work step trigger signal which is applied simultaneously to the column counter 1 as well as to the monostable multivibrator 14 is delayed or held or extended by the monostable multivibrator 14 until the preselection signals have been identified in the logic circuits of the identifying channel in order to assure coincidence at the two inputs of AND gate 12. Thus, the monostable multivibrator 14 provides a compensation for the delay which occurs when the signals pass through the column or row counters 1 or 2, through the preselection units 5 and 6, through AND gates 7 and through OR gates 8, 43 and 44.

When the required signal count is indicated by a correspondence between the digit or coordinate adjustment of the preselection units and the count reached by the column or row counter, a logic "zero" signal appears at the output of the signal inverter 11. Stated differently, in the shown position of the switch 27, it will not be possible for the signal to provide a coincidence at the AND gate 12. Therefore, no control signal will appear at the output of the AND gate 12 and the control member 13 will remain inactive. Thus, by means of the switch 27 it is possible to either assure the actuation of the control member 13 or to prevent its actuation when the switch is in the position bypassing the signal inverter 11 by connecting the bypass 12a directly to one input of the AND gate 12. Hence, the process step is either prevented or carried out in all preselected matrix points. In the downward position of the switch 27, a process step is carried out only in the matrix points which have been predetermined by the adjustment of the preselection units 5 and 6.

FIG. 4 illustrates a circuit arrangement in which the signal delay in the preselection signal-identifying channels is eliminated so that the work step or process triggering signal may be fed without delay to the input of the AND gate 12. The signals which have been identified as individual field signals or as column signals are fed to inputs 40' and 42' which are connected to the outputs 40 and 42 shown in FIG. 2. The input 40' and 42' are further connected through a multiposition switch 33b to the input of a monostable multivibrator 15 through a signal inverter 26. The monostable multivibrator 15 has a delay time T15 and is connected with its output to one input of a bistable multivibrator 17 whereby the latter is triggered out of its basic or reset position. The signal inverter 26 merely serves for producing the desired signal polarity. A second monostable multivibrator 16 is connected with its input to a work step trigger source which provides the necessary work step trigger signal. This source is the output of the preselection unit 66. The second monostable multivibrator 16 has a delay time T16 after the lapse of which the bistable multivibrator 17 is reset to its basic or reset position by work step trigger signal provided the bistable multivibrator 17 was in its triggered or set or working position due to the fact that an identified preselection signal was present to flip the bistable multivibrator 17 into its set position.

An output of the bistable multivibrator 17 is directly connected to a further switch member 33a and through such switch member 33a to the input of the signal inverter 11. The connection of the inverter 11 to one input of the AND gate 12 through the selector switch 27 is the same as that in FIG. 3. However, the other input of the AND gate 12 is directly connected to the source of work step trigger signals as shown at 38' in FIG. 4.

Upon reaching a matrix point which has been marked by an individual field preselection or by a column preselection, the bistable multivibrator 17 is initially in its basic position so that in the shown position of the switch 27 the work step trigger signal which is directly fed to the AND gate 12 and which identifies the same matrix point is passed on to the control member 13 where it causes the required triggering for carrying out the process or testing step. Subsequent to the expiration of the delay time T15, the bistable multivibrator 17 flips into its working position, so that upon reaching the next following matrix point a logic "zero" signal is applied to said one input of AND gate 12. As a result, the work step trigger signal cannot reach the control member 13 and the process step is prevented in the next adjacent matrix point. When the delay time T16 has lapsed the bistable multivibrator 17 is flopped back into its basic position by the monostable multivibrator 16, whereby T16 must be shorter in duration than T15. Therefore, a preselection adjusted to the digit $x_n$ becomes effective as a column selection or as an individual field preselection only at the coordinate $x_n+1$. Stated differently, a preselection of the coordinate $x_n$ must be accomplished by adjusting the respective preselectors to the preselection digit or coordinate number $x_n-1$.

Referring now to FIG. 5, it will be noted that the input terminals 34', 35', 36' and 38' are connected to respective output terminals 34, 35 and 36, as well as to input terminal 38 as shown in FIG. 1. The circuit arrangement according to FIG. 5 is analogous to that of FIG. 3. However, the embodiment of FIG. 5 makes it possible to arrange simultaneously and completely, independently of each other, different extraneous structures in columns, in rows and in individual fields. In describing FIG. 5, a complicated example shall be elucidated with reference to FIG. 7. In the example, extraneous structures in the columns are to be distinguished from the extraneous structures in the rows as well as from the extraneous structures of the individual fields.

The identified preselection signals, which are fed from the outputs of FIG. 1 to the inputs of FIG. 5, are supplied through switches 28, 29 and 30 to the input of an OR gate 18, the output of which is connected to one input of an AND gate 21. The output of the AND gate 21 is connected to a circuit arrangement as shown in FIG. 3 for combining the identified preselection signals with the work step trigger signals. The other input of the AND gate 21 receives the identified preselection signals through switches 31, 32 and through an inverting OR gate 20 whereby the switch 32 connects one input of the inverting OR gate 20 to the output of an AND gate 19 having two inputs which are connected to the input terminals 34' and 35'. The shown position of the switches 31 and 32 assures that a logic 1 signal is supplied to the second input of the AND gate 21. Such logic 1 signal is provided by the inverting or negating OR gate 20 which is also known as an NOR gate. As a result, the carrying into effect of the typical process steps is prevented during the first motion cycle at all matrix points which were marked by the preselection units. Stated differently, no process steps are carried out at preselected matrix points during the first motion cycle. However, during the next following motion cycles subsequent to shifting the switch 27 into its dotted line position and with the switch 29 in its closed position the extraneous structures of the columns will be inserted or arranged in the matrix. Similarly, with switch 30 closed the extraneous structures of the rows will be inserted, whereas with switch 28 closed the extraneous structures of the individual fields will be inserted.

The AND gate 19 combines the identified column preselection signals with the identified row preselection signals to accomplish that at the crossing points of rows and columns either the extraneous structure of the row or that of the column is inserted or arranged. In the shown position of the switch 32, the extraneous structures are inserted only at the crossing points during the motion cycle which is just taking place. For example, with the switch 29 and 32 closed and the switch 28 and 30 opened the extraneous structures are assigned to the column. On the other hand, with the switch 32 in its opened position, the extraneous structures are omitted. By combining the preselection signals of the individual fields with the signals of matrix points through the OR gate 20 it is possible to insert additional extraneous structures by suitably adjusting the preselection units 5 and 6. Such additional extraneous structures are positioned in the rows or in the columns. However, these additional extraneous structures are not identical with the structures of the rows or columns. These additional extraneous structures are omitted when the switch 31 is in its closed, not shown, position.

The embodiment of FIG. 6 offers the same possibilities as that of FIG. 5. However, in FIG. 6 the delay monostable multivibrator 14 has been omitted so that the work step trigger signals are fed to the control member 13 without delay just as in FIG. 4. The monostable multivibrators 22 and 23, as well as the bistable multivibrators 24 and 25, correspond with regard to their function to the elements 15 and 17 of FIG. 4, whereby one combination 22, 24 serves for arranging the columns, whereas the other combination 23, 25 serves for arranging the individual fields. The signal inverter 26 and 26a serve merely for the purpose of signal matching or adapting.

Reverting briefly to FIGS. 1 and 2, it will be noted that these FIGS. comprise circuit elements which will effect a shortening of the motion cycle of the positioning apparatus or device 73 as shown in FIG. 9. FIG. 1 comprises an OR gate 45 which logically combines the row preselection units 6a to 6l for individual fields. OR gate 45 has an output 46 which produces a signal provided that the count of the row counter 2 corresponds to one of the preselection digits. Similarly, the output 35 of the OR gate 10 provides an output signal when one of the preselection digits of the preselection units 4a to 4n for the rows corresponds to the count of the row counter 2. If the two signals appearing at the output terminals 35 and 46 are fed to the control device 67 shown in FIG. 9, then only those rows will be covered by the motion of the cross table 58 or scanned by the cross table 58 which rows comprise preselected matrix points.

In addition, there are provided output terminals 47 and 48 for the preselection units 6l and 4n which are always adjusted to the maximum preselection digit. By connecting the outputs 47 and 48 to the control device 67 as shown in FIG. 9, through lines 47a and 48a, it is assured that the motion of the cross table 58 is stopped upon reaching the maximum preselected digits. A stopping of the cross table 58 is also accomplished by connecting the outputs 41 and 47 of the OR gate 44 or of the preselector 61 to the control device 67.

Figure 7:
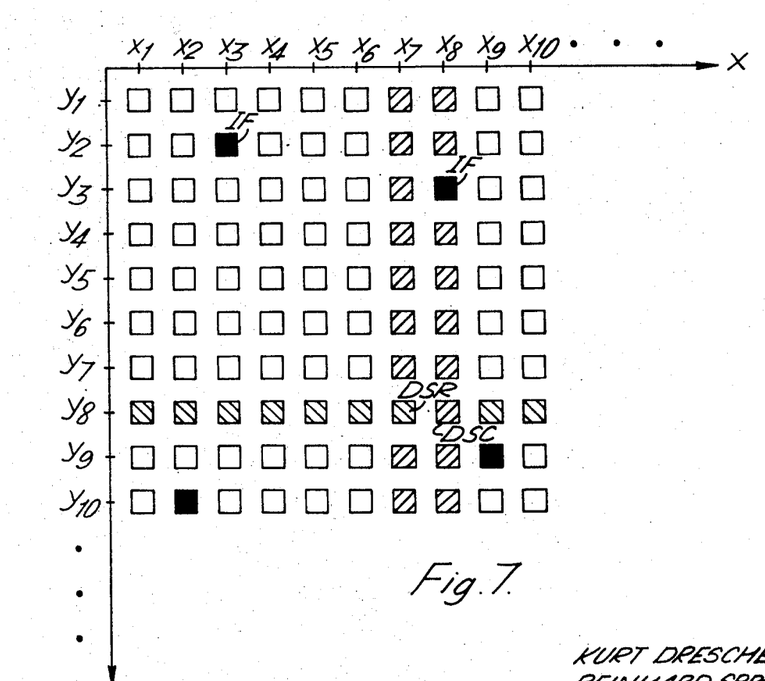
FIG. 7 shows the arrangement of extraneous structures in a matrix scheme whereby these structures are provided in the form of individual fields, columns and rows.

FIG. 7 illustrates a matrix with rows $y1$ to $y10$ extending in the $x$-direction or coordinate and with column $x1$ to $x10$ extending in the $y$-direction or coordinate. FIG. 7 further illustrates in a schematic manner the different possibilities of arranging extraneous structures in a complete matrix field. The extraneous structures are identified or fixed as individual fields by pairs of coordinates such as ($x_n$, $y_n$; $x3$, $y2$; $x8$, $y3$; $x9$, $y9$; and $x2$, $y10$). The extraneous structures of the columns are fixed or identified by $x$ coordinate values ($x7$; $x8$) and the extraneous structures of the rows are identified by $y$ coordinate values ($y8$). At the crossing point of the row $y8$ with the column $x7$ there is located an extraneous structure DSR of the row. At the crossing point between the row $y8$ and the column $x8$ there is located the extraneous structure DSC of the column. The individual field IF is identified, for example, between the column $x8$ and the row $y3$ and thus has the coordinate $x8$, $y3$. Such individual field IF comprises a different extraneous structure than that of the remainder of the column $x8$.

We claim:

1. An electronic circuit arrangement for performing predetermined work steps in the production or testing of semiconductor means arranged in rows and columns to form a matrix of said semiconductor means in a coordinate system, with individual fields defined at intersections of said rows and columns, comprising: Positioning means including column-spacing measuring means and row-spacing measuring means, each of said column and row-spacing measuring means having respective outputs, a column counter having an input operatively connected to the output of said column-spacing measuring means, a row counter having an input connected to the output of said row-spacing measuring means, said column counter and said row counter providing respective coordinate signals corresponding to column coordinates and to row coordinates in said matrix, adjustable column preselector means and adjustable row preselector means each having respective input and output terminals and providing preselected coordinate digits, said column counter having an output connected to said input terminals of the column preselector means and said row counter having an output connected to the input terminals of the row preselector means for comparing said preselected coordinate digits with the coordinate signals to produce preselection signals, identifying logic circuit means operatively connected to the output terminals of said adjustable column and row preselector means for identifying said preselection signals, work step signal means, further logic circuit means operatively connected to said identifying logic circuit means and to said work step signal means for combining the identified preselection signals with work step trigger signals to produce control signals, control drive means for a tool and for said positioning means connected to said further logic circuit means for controlling the tool and the positioning means in accordance with the preselected digits of said preselector means and in accordance with said work step trigger signals.

2. The electronic circuit arrangement according to claim 1, wherein said identifying logic circuit means comprise: first logic OR means connected between certain of the output terminals of said column preselector means and said further logic circuit means for identifying certain of said preselection signals as column signals, second logic OR means connected between the output terminals of certain of said row preselector means and said further logic circuit means for identifying certain other of said preselection signals as row signals, logic AND means and third logic OR means, said logic AND means having inputs connected to certain other of said column preselector means and to certain other of said row preselector means said logic AND means having outputs connected to the third logic OR means which are operatively connected to said further logic circuit means for identifying said still other preselection signals as individual field signals.

3. The electronic circuit arrangement according to claim 2, comprising switching means operatively connected between said identifying logic circuit means and said further logic circuit means for combining said identified preselection signals with said work step trigger signals.

4. The electronic circuit arrangement according to claim 1, comprising signal stretching means including a monostable multivibrator.

5. The electronic circuit arrangement according to claim 2, comprising signal inverter means operatively connected between said identifying logic circuit means and said further logic circuit means for skipping said identified preselection signals.

6. The electronic circuit arrangement according to claim 3, further comprising signal inverter means connected in series with said switching means, and bypass means connected in parallel with said inverter means for selectively bypassing the inverter means.

7. The electronic circuit arrangement according to claim 2, wherein said column preselector means comprise column preselector units as well as individual field column preselector units, said column preselector units being connected to said first logic OR means, said individual field column preselector units being connected through said logic AND means to the third logic OR means, said row preselector means comprising row preselector units and individual field row preselector units, said row preselector units being connected to said second logic OR means, said individual field row preselector units also being connected through said logic AND means to the third logic OR means.

8. The electronic circuit arrangement according to claim 1, wherein said identifying logic circuit means comprise first, second and third OR gates and pairs of AND gates, said first OR gate being connected to said column preselector means, said second OR gate being connected to said row preselector means, said third OR gate being connected through said pairs of AND gates to pairs of preselector means, each pair of preselector means comprising a column preselector means and a row preselector means.

9. The electronic circuit arrangement according to claim 8, further comprising first and second monostable multivibrators each having an input and an output and a signal storage means having two inputs and an output, one input of the signal storage means being connected to the output of said first monostable multivibrator and the other connected to the output of the second monostable multivibrator, a signal-adapting member connected to the input of the first monostable multivibrator, switching means operatively connected between said signal-adapting member and said first and third OR gates for selectively connecting said first and third OR gates to the first monostable multivibrator, means connecting the input of the second monostable multivibrator to said work step signal means, circuit means for connecting the output of said signal storage means to one input of said further logic circuit means, and means for connecting another input of said further logic circuit means to said work step signal means.

10. The electronic circuit arrangement according to claim 9, wherein said signal storage means is a bistable multivibrator.

11. The electronic circuit arrangement according to claim 9, wherein said signal-adapting member is an inverter.

12. The electronic circuit arrangement according to claim 10, wherein said circuit means for connecting the output of the bistable multivibrator to the further logic circuit means comprise a selector switch.

13. The electronic circuit arrangement according to claim 12, wherein said circuit means for connecting the output of the bistable multivibrator to the further logic circuit means comprise a signal inverter connected in series with said selector switch.

14. The electronic circuit arrangement according to claim 13, further comprising a bypass means connected in parallel to said signal inverter and a further selector switch connected for selectively connecting the inverter and the bypass to the further logic circuit means.

15. The electronic circuit arrangement according to claim 9, wherein each of said first and second monostable multivibrator has a signal-delaying time constant, the time constant of the first monostable multivibrator being longer than that of the second monostable multivibrator.

16. The electronic circuit arrangement according to claim 1, wherein said identifying logic circuit means comprise means for identifying column signals, row signals and individual field signals, and further comprising a first logic OR gate, and first switching means operatively connected between outputs of said column, row and individual field signal-identifying logic means, and respective individual inputs of said first logic OR gate, a first logic AND gate having one input connected to an output of the first logic OR gate, a signal inverter connected with an input to an output of said first logic AND gate, first circuit means for connecting said signal inverter to said control drive means, a second logic AND gate, further circuit means for connecting said column and row signal identifying logic circuit means to respective inputs of said second logic AND gate to produce column and row-crossing point signals, a second logic OR gate and second switching means for connecting an input of said second OR gate to an output of said second AND gate, said further OR gate being connected with its output to another input of the first logic AND gate, third switching means for connecting another input of said second OR gate to said individual field signal identifying logic circuit means, whereby said first logic AND gate combines said identified column; row; individual field; and crossing point signals.

17. The electronic circuit arrangement according to claim 16, comprising bypass means connected in parallel to said signal inverter and in series with said first circuit means including a selector switch, a third logic AND gate connected in series between said selector switch and said drive means, and signal-stretching means connected between said third logic AND gate and said work step signal means.

18. The electronic circuit arrangement according to claim 16, further comprising a first series connection including first inverter member, a first monostable multivibrator, and a first bistable multivibrator, said first series connection being connected with an input of said first inverter member to said identifying logic circuit means for column signals, and with an output of said first bistable multivibrator to an input of the second logic AND gate as well as through said first switching means to the respective input of said first logic OR gate, another input of said second logic AND gate being connected to the row signal identifying logic circuit means which are also connected through said switching means to a respective input of the first logic OR gate, a second series connection including a second inverter member; a second monostable multivibrator, and a second bistable multivibrator, said second series connection being connected with an input of the second inverter member to said identifying logic circuit means for individual field signals, and with an output of the second bistable multivibrator through said first switching means to the respective input of the first logic OR gate and through said third switching means to an input of the second logic OR gate, a third monostable multivibrator having an input connected to said work step signal means and an output connected to equivalent inputs of said first and second bistable multivibrators, said first logic OR gate being also connected with a respective input through said first switching means to said identifying logic circuit means for said row signals.

19. The electronic circuit arrangement according to claim 18, further comprising bypass means connected in parallel to said signal inverter and in series with said first circuit means comprising a selector switch, a third logic AND gate connected in series between the selector switch and said drive means, said third logic AND gate having an input connected to said work step signal means.

20. The electronic circuit arrangement according to claim 1, wherein for the preselection of individual fields identified by pairs of coordinate digits $x_n$, $y_n$ and for the preselection of columns identified by coordinate digits $x_n$, said adjustable column preselector means which are connected to said column counter, are adjusted to column coordinate digits corresponding to $x_n-1$, whereas said adjustable row preselector means which are connected to said row counter, are adjusted to row coordinate digits corresponding to $y_n$.

21. The electronic circuit arrangement according to claim 1, further comprising binary to decimal decoding means in said column counter and in said row counter.

22. The electronic circuit arrangement according to claim 1, wherein said identifying logic circuit means comprise first OR gate means, said adjustable row preselector means comprising preselection units for preselecting row coordinates for individual fields, said first OR gate means having inputs connected to said preselection units for logically combining row coordinates for individual fields, said identifying logic circuit means comprising second OR gate means having inputs connected to said row preselector means, said first and second OR gate means having outputs connected to said control drive means of the positioning means in such a manner that said positioning means scan only those rows which are preselected by said row preselector means.

23. The electronic circuit arrangement according to claim 22, wherein said control drive means comprise stop means for said positioning means, said row preselector means comprising members adjusted to a maximum preselection row digit, said row preselector members being connected to said stop means for stopping the positioning means in response to the completion of the scanning of the row corresponding to said maximum digit.

24. The electronic circuit arrangement according to claim 1, further comprising signal stretching means connected between said further logic circuit means and said work step signal means for stretching said work step trigger signals to coincide with said identified preselection signals.